US009465180B2

(12) United States Patent
Marmon et al.

(10) Patent No.: US 9,465,180 B2
(45) Date of Patent: Oct. 11, 2016

(54) STRAIN RELIEF CLAMP

(71) Applicant: Tyco Electronics Corporation, Berwyn, PA (US)

(72) Inventors: Thomas Ross Marmon, Angier, NC (US); Barry Wayne Allen, Siler City, NC (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/701,113

(22) Filed: Apr. 30, 2015

(65) Prior Publication Data

US 2015/0316739 A1    Nov. 5, 2015

Related U.S. Application Data

(60) Provisional application No. 61/987,108, filed on May 1, 2014.

(51) Int. Cl.
*G02B 6/00* (2006.01)
*G02B 6/44* (2006.01)

(52) U.S. Cl.
CPC ............... *G02B 6/44* (2013.01); *G02B 6/4477* (2013.01); *G02B 6/4454* (2013.01)

(58) Field of Classification Search
None
See application file for complete search history.

(56) References Cited

U.S. PATENT DOCUMENTS

| | | | | |
|---|---|---|---|---|
| 4,358,177 A | * | 11/1982 | Badolato | H01R 13/595 439/472 |
| 4,367,568 A | * | 1/1983 | Weiser | E04C 5/122 24/122.6 |
| 4,448,474 A | * | 5/1984 | Melnychenko | H01R 23/70 439/284 |
| 6,137,936 A | | 10/2000 | Fitz et al. | |
| 8,391,666 B2 | * | 3/2013 | Hetzer | G02B 6/4471 385/134 |
| 2002/0064365 A1 | | 5/2002 | Battey et al. | |
| 2003/0174998 A1 | * | 9/2003 | Shevchuk | G02B 6/3885 385/137 |
| 2008/0210829 A1 | * | 9/2008 | Hetzer | H02G 15/007 248/68.1 |
| 2014/0112628 A1 | * | 4/2014 | Keenum | G02B 6/428 385/89 |
| 2015/0063760 A1 | * | 3/2015 | Pommer | G02B 6/4251 385/79 |

FOREIGN PATENT DOCUMENTS

WO    WO 2009/146022 A2    12/2009
WO    WO 2013/090736 A1    6/2013

OTHER PUBLICATIONS

International Search Report and Written Opinion for Application No. PCT/US2015/027160 mailed Jul. 28, 2015.

* cited by examiner

*Primary Examiner* — Sung Pak
(74) *Attorney, Agent, or Firm* — Merchant & Gould P.C.

(57) ABSTRACT

A strain relief clamp system and method include a base with a plurality of plates arranged in a stack on the base. A fastener, such as a bolt having a nut threaded thereon, is situated to selectively draw the plates against the base so as to clamp a fiber optic cable strength member received between adjacent plates.

13 Claims, 3 Drawing Sheets

STRAIN RELIEF CLAMP

CROSS REFERENCE TO RELATED APPLICATION

This application claims the benefit of provisional application Ser. No. 61/987,108, filed May 1, 2014, which is incorporated herein by reference in its entirety.

BACKGROUND

The present disclosure relates generally to fiber optic cable systems.

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Fiber management is an important part of operating and maintaining an effective fiber optic communication system.

Optical fibers are often connected to one another via splices. For example, a trunk or main cable may be routed to an area to which service is to be provided and small fiber count "drop cables" may be spliced to the main cable at predetermined spaced apart locations. Splices are often supported within splice closures to protect the spliced connections from the environment. The fiber optic cable is typically secured to the enclosure, for instance by removing the cable outer jacket in order to expose some length of the strength members of the cable. The cable strength elements are typically attached to the enclosure so as to provide strain relief.

SUMMARY

In accordance with aspects of the present disclosure a strain relief clamp system includes a base with a plurality of plates arranged in a stack on the base. A fastener, such as a bolt having a nut threaded thereon, is situated to selectively draw the plates against the base so as to clamp a fiber optic cable strength member received between adjacent plates. The plurality of plates are arranged in first and second stacks in some examples, with one or more fiber optic cable strength members received between adjacent ones of the plates.

In accordance with further aspects of the disclosure, a cable enclosure includes a housing having a floor with a clamp base. A plurality of plates are arranged in a stack on the base, and a fastener is situated to selectively draw the plates against the base so as to clamp one or more fiber optic cable strength members received between adjacent plates. A fastener connects the base to the floor in some examples. In some embodiments, a splice tray is situated on alignment tabs that extend from the base and through alignment openings formed in the plates.

In accordance with still further aspects of the disclosure, a method of providing strain relief for a fiber optic cable includes exposing one or more strength members of one of more fiber optic cables. The strength members are positioned between adjacent plates of a plurality of stacked plates, and a fastener is tightened to draw the plates together to clamp the strength members received between the adjacent plates.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as top, bottom, front, back, etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense.

When multiple fiber optic cables enter an enclosure such as a fiber optic splice closure, the cable is typically fastened to the enclosure to provide strain relief. Clamping is one method of strain relief performed by clamping down on a cable's internal strength members to securely lock them in place. Multiple individual strain reliefs often demand a large foot print inside a fiber optic enclosure.

Figure 1:
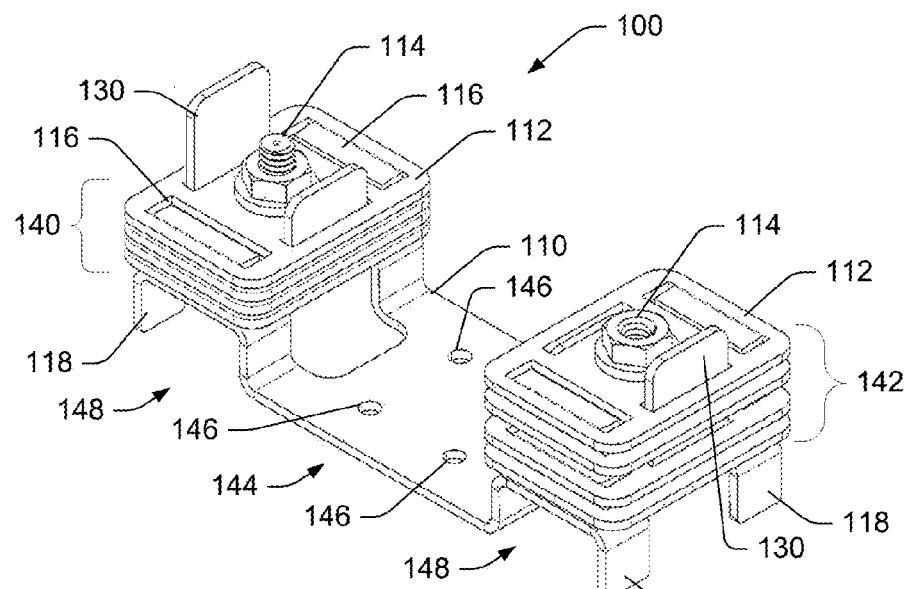
FIG. 1 is a perspective view illustrating aspects of an example of a strain relief clamp system in accordance with the present disclosure.

FIG. 1 illustrates an example of a strain relief clamp system in accordance with aspects of the present disclosure. The strain relief clamp 100 includes a base 110 that is configured to be connected to an enclosure housing such as a splice closure. In some embodiments, the base 110 is integrally formed with the enclosure housing. A plurality of plates 112 are arranged in a stack on the base 110. A fastener 114 is situated to selectively draw the plates 112 against the base 110 so as to clamp a fiber optic cable strength member received between adjacent plates 112.

In the illustrated example, the fastener 114 includes a bolt 120 that extends through fastener openings 124 extending through the plates 112. The base 110 also has an opening 126 that receives the bolt 120, and a nut 122 is threaded onto the bolt 120. In some embodiments, the bolt 120 is a self-clinching stud that having a bolt head 128 secured directly onto the base 100. The base 110 can be fabricated from sheet metal, for example. Other embodiments could use a standard hex bolt, for example.

The illustrated example, alignment tabs 130 extend from the base 100. Each of the plates 112 has corresponding alignment openings 132, and the alignment tabs 130 extend through the alignment openings 132. The embodiment depicted includes first and second alignment tabs 130 situated on opposite sides of the fastener opening 126, with the corresponding alignment openings 132 situated on opposite sides of the fastener opening 124. In the clamp system 100 illustrated in FIGS. 1 and 2, the alignment tabs 130 are integrally formed with the base 110. In some examples, the base 110 is formed of sheet metal and the alignment tabs 130 are cut out and bent up from the base 110. In some examples, the plates 112 include a portion bent slightly downwards to sheet metal walls 116. The embodiment illustrated has two sheet metal walls 116 in each plate 112 arranged on either side of the fastener openings 124, oriented generally perpendicular to the alignment openings 132. The sheet metal walls 116 form a sharp edge that bites into the strength members received between the plates 112 to help prevent the strength members from pulling out from between the plates 112.

Figure 2:
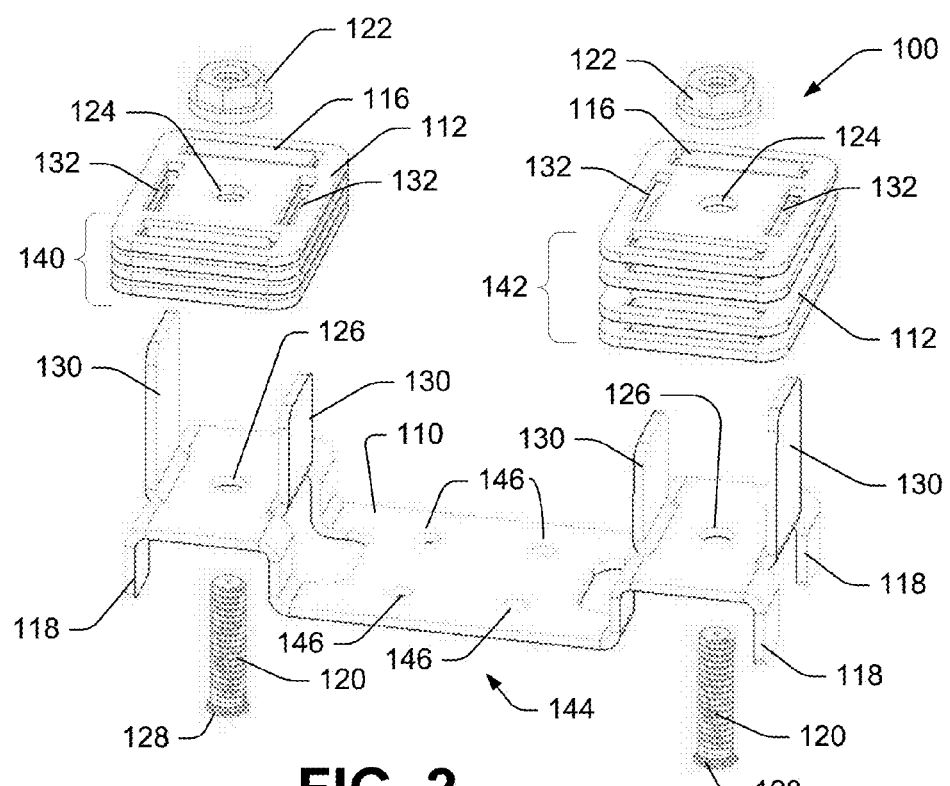
FIG. 2 is an exploded perspective view of the clamp system shown in FIG. 1.

The plates 112 shown in FIGS. 1 and 2 are arranged in two stacks 140,142 separated by a central portion 144 of the base 110. The central portion 144 includes openings 146 therein for receiving fasteners to attach the base 110 to an enclosure such as a splice closure. The outer portions 148 of the clamp 100 on either side of the central portion 144 include tabs 118 bent downwardly, extending in a direction opposite the alignment tabs 130. The outer portions 148 in the illustrated examples are thus raised relative to the central portion 144. This gives clearance for the head 128 of the bolt 120.

Figure 3:
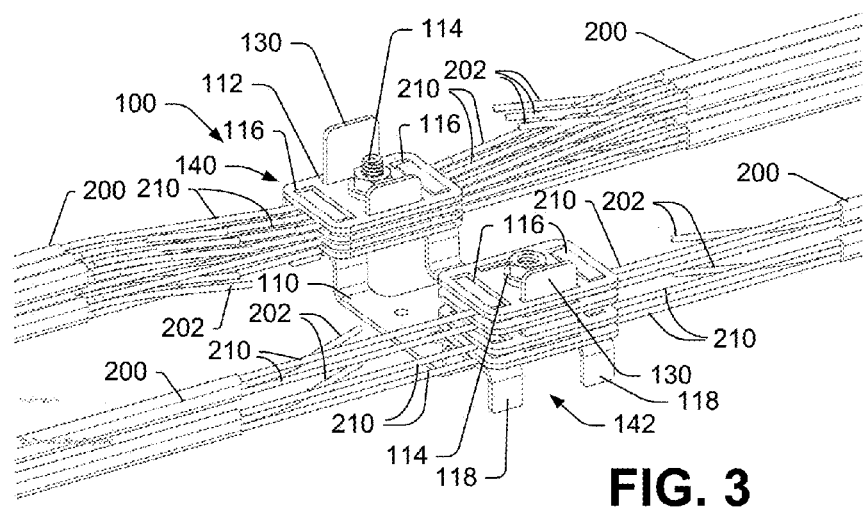
FIG. 3 is a perspective view of the clamp system shown in FIG. 1, and fiber optic cables clamped therein.

FIG. 3 illustrates the clamp system 100 receiving a plurality of cables 200. In the illustrated example, the cables 200 are fiber optic cables having one or more optical fibers 202 and strength members 210. A single strain relief clamp system 100 is capable of strain relieving multiple cables 200 at once using a single fastener 114 as shown in FIG. 3. Strain relief is performed by exposing the strength members 210 of the cables 200 and sliding the strength members 210 between adjacent ones of the stacked plates 112. When all of the cables 200 are in place, an operator tightens the fastener 114, compressing the strength members 210 between adjacent plates 112 to clamp the strength members 210, and thus the associated cables 200, in place. As the plates 112 are drawn together by fastener 114, the sheet metal walls 116 bite into the strength members 210 to even more securely hold them in place. In FIG. 3, the strength members 210 can be received in one or both sides of the plates 112 (on either side of the fastener 114). Thus, the compressive force is not distributed among the cables 200 due to being stacked. Instead, each strength member 210 sees the full compressive force of the system, as opposed to if they were laid out flat and a single plate was clamping all of them down.

Figure 4:
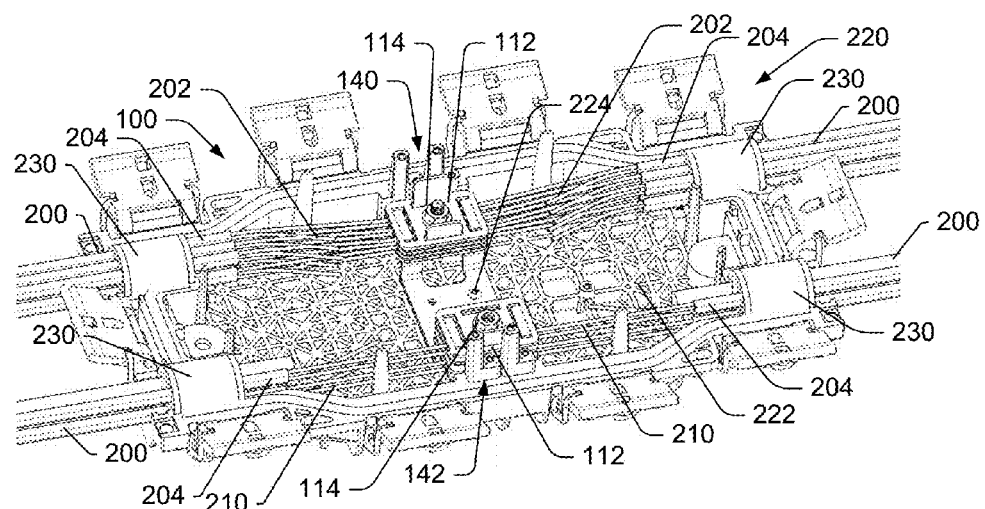
FIG. 4 is a perspective view of a cable enclosure including a clamp system such as that shown in FIG. 1.
Figure 5:
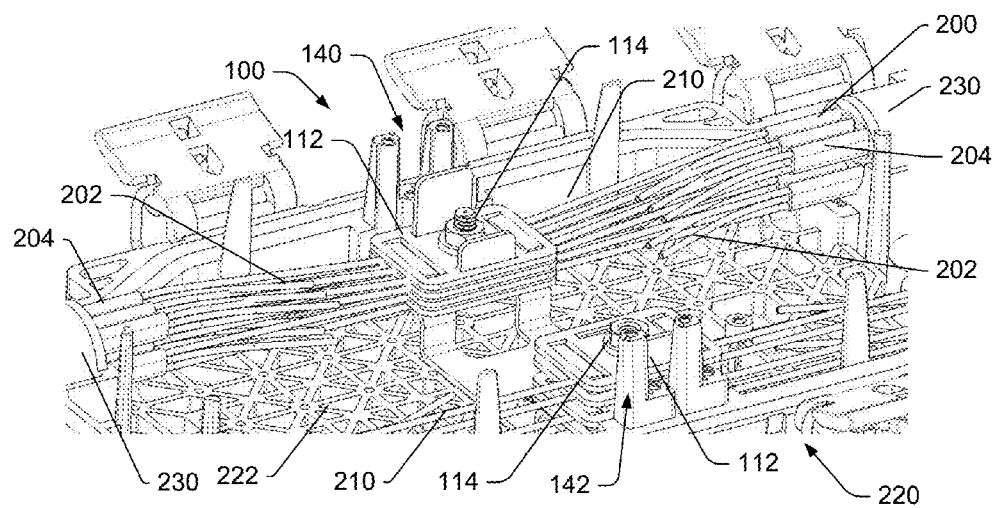
FIG. 5 is a close up view of the cable enclosure and clamp system shown in FIG. 4.

FIGS. 4 and 5 illustrate an example of the clamp system 100 fastened to an enclosure 220, such as a splice closure. The clamp 100 is fastened to a floor 222 of the enclosure 220 by any suitable fastening device such as the screw 224 shown in FIG. 4. Other suitable fasteners could include bolts, rivets, adhesives, etc. The cables 200 are received in cable openings 230 and may be clamped therein (i.e., about the outer jacket 204 of the cable 200). The outer jacket 204 of the cables 200 are stripped off for the portion of the cables 200 situated inside the enclosure 220, giving access to the optical fibers 202 and strength members 210 thereof. The strength members 210 are received between adjacent plates 112 of the first and second stacks 140, 142 and clamped therebetween when the fastener 114 is tightened to compress the stacks 140,142 of plates 112 against the base 110. In FIGS. 3-5, the optical fibers 202 are shown shortened for ease of illustration. In practice, longer lengths of the optical fibers 202 are managed within the enclosure 220.

Figure 6:
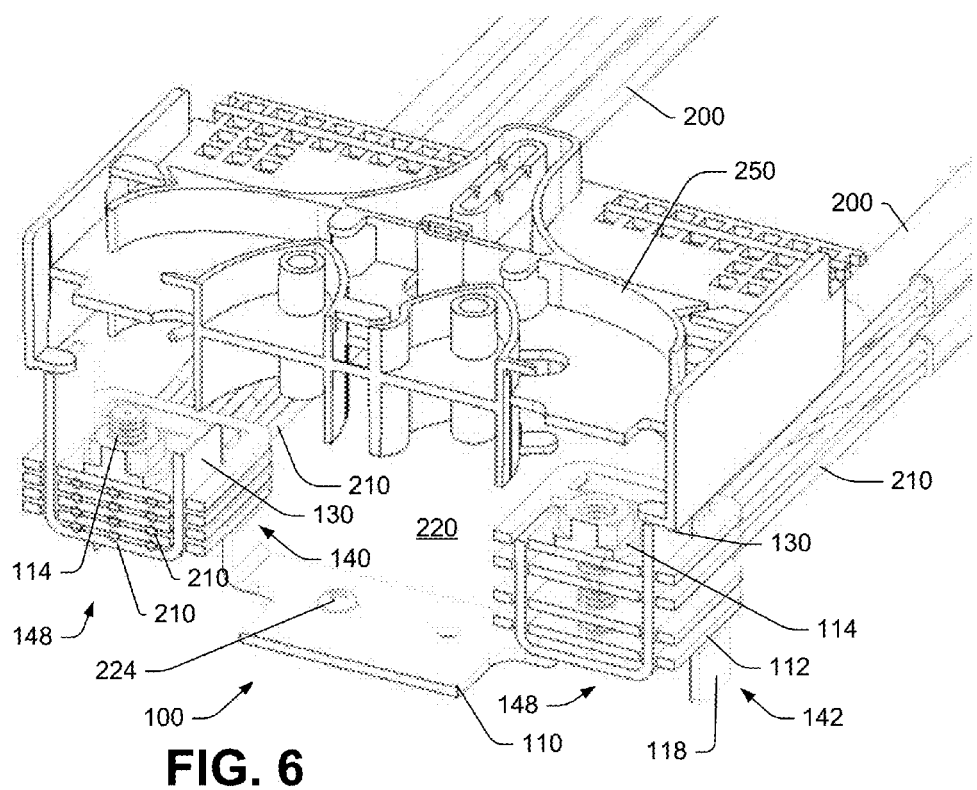
FIG. 6 is a cross-section perspective view of the clamp system shown in FIG. 1 and further illustrating a splice tray associated therewith.

FIG. 6 shows the clamp system 100 attached to the enclosure 220, with a splice tray 250 situated above the clamp 100. The alignment tabs 130 positioned towards the outer sides of the enclosure 220 are taller than the inner alignment tabs 130. In the illustrated example, this provides a support for positioning the splice tray 250 at the desired location.

Various modifications and alterations of this disclosure may become apparent to those skilled in the art without departing from the scope and spirit of this disclosure, and it should be understood that the scope of this disclosure is not to be unduly limited to the illustrative examples set forth herein.

What is claimed is:

1. A strain relief clamp system, comprising:
   a base;
   a first alignment tab extending from the base;
   a second alignment tab extending from the base;
   a plurality of plates arranged in a stack on the base;
   each plate having a fastener opening extending generally through the center of the plate;
   each plate having a first alignment opening and a second alignment opening therethrough, the first and second alignment openings being situated on either side of the fastener opening:
   the first alignment tab extending through the first alignment openings;
   the second alignment tab extending through the second alignment openings;
   a fastener connected to the base and extending through the fastener openings, the fastener being situated to selectively draw the plates against the base so as to clamp a fiber optic cable strength member received between adjacent plates.

2. The clamp system of claim 1, wherein the first alignment tab is integrally formed with the base.

3. The clamp system of claim 1, wherein the first alignment tab is longer than the second alignment tab.

4. The clamp system of claim 1, wherein the fastener is a bolt having a bolt head attached to the base.

5. The clamp system of claim 1, wherein the plurality of plates are arranged in first and second stacks.

6. The clamp system of claim 1, further comprising a fiber optic cable strength member received between adjacent ones of the plates.

7. A cable enclosure, comprising:
   a housing having a floor including a clamp base;
   a plurality of plates arranged in a stack on the base;
   a first alignment tab extending from the base, each plate having a first alignment opening therethrough with the first alignment tab extending through the first alignment openings;
   a second alignment tab extending from the base, each plate having a second alignment opening therethrough with the second alignment tab extending through the second alignment openings;
   a splice tray situated on the first alignment tab and not on the second alignment tab; and
   a fastener situated to selectively draw the plates against the base so as to clamp a fiber optic cable strength member received between adjacent plates.

8. The cable enclosure of claim 7, further comprising a fastener connecting the base to the floor.

9. The cable enclosure of claim 7, wherein each plate has a fastener opening therethrough, and wherein the fastener is connected to the base and extends through the fastener openings.

10. The cable enclosure of claim 7, wherein:
    each plate has a fastener opening extending generally through the center of the plate;
    the fastener is connected to the base and extends through the fastener openings; and
    the first and second alignment openings are situated on either side of the fastener opening.

11. A method of providing strain relief for a fiber optic cable in an enclosure, comprising:

exposing a strength member of a fiber optic cable;
providing a plurality of stacked plates in the enclosure;
situating a. fastener connected to a. base of the enclosure through a fastener opening generally in the center of each of the plates;
situating alignment tabs extending from the base of the enclosure through first and second alignment openings on either side of the fastener opening in each of the plates;
positioning the strength member between adjacent plates of the plurality of stacked plates; and
tightening the fastener to draw the plates together to clamp the strength member received between the adjacent plates.

12. The method of claim 11, further comprising:
exposing plurality of strength members of a respective plurality of the fiber optic cables;
positioning the strength members between adjacent plates of the plurality of stacked plates; and
tightening the fastener to draw the plates together to clamp the strength members received between the adjacent plates.

13. The method of claim 11, further comprising:
positioning a splice tray on the alignment tab.

* * * * *